Feb. 11, 1958  J. CRAGGS ET AL  2,822,913
EXTENSIBLE CONVEYOR
Filed Nov. 23, 1955  3 Sheets-Sheet 1
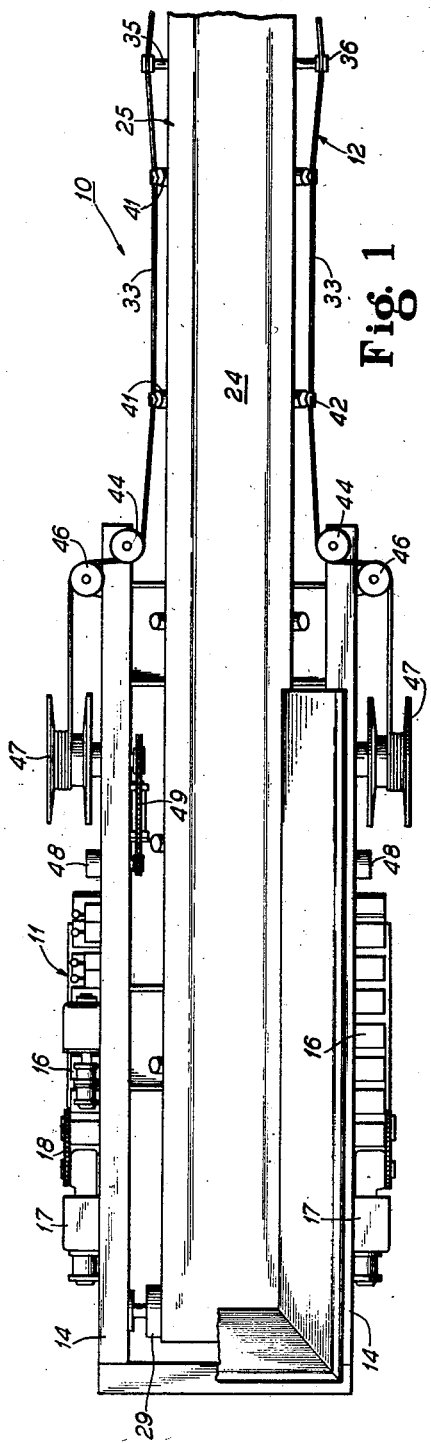
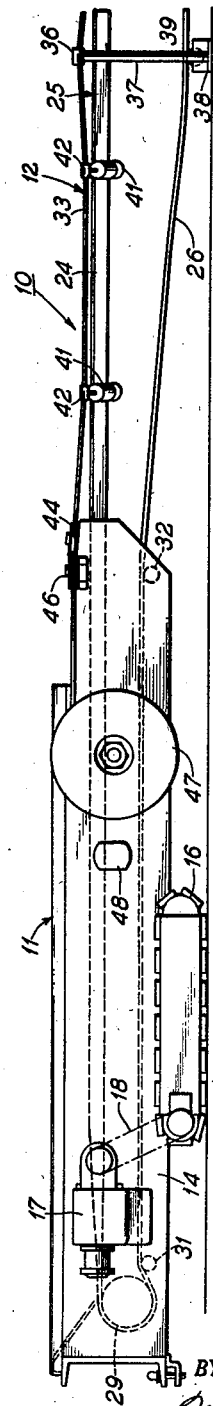
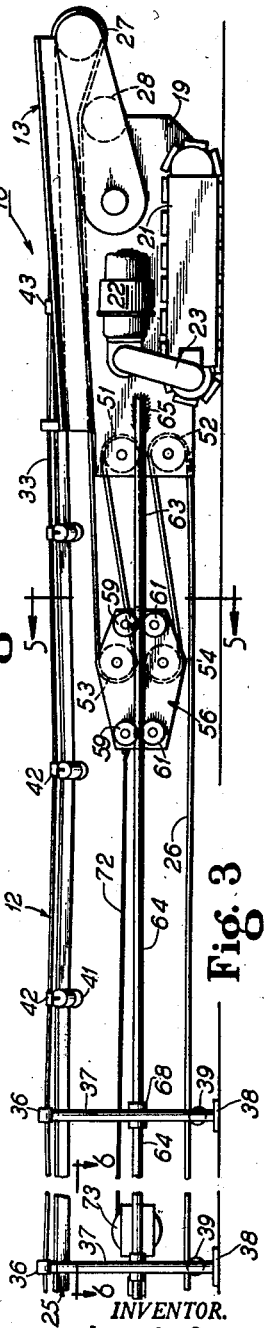
INVENTOR.
Joseph Craggs
Keith McCann
BY
Murray A. Gleeson
ATTORNEY Feb. 11, 1958

J. CRAGGS ET AL 2,822,913

EXTENSIBLE CONVEYOR

Filed Nov. 23, 1955

INVENTOR.
Joseph Craggs
Keith McCann
BY
Murray A. Gleeson
ATTORNEY

Feb. 11, 1958

J. CRAGGS ET AL 2,822,913

EXTENSIBLE CONVEYOR

Filed Nov. 23, 1955

INVENTOR
Joseph Craggs
Keith McCann
BY
Murray A. Gleeson
ATTORNEY

United States Patent Office 2,822,913
Patented Feb. 11, 1958

2,822,913

EXTENSIBLE CONVEYOR

Joseph Craggs and Keith McCann, Taylorville, Ill., assignors to Goodman Manufacturing Company, Chicago, Ill., a corporation of Illinois Application November 23, 1955, Serial No. 548,622

13 Claims. (Cl. 198—139)

This invention relates generally to an extensible conveyor and more particularly to improvements in such a conveyor whereby a larger amount of storage of the belt may be provided, and also whereby the belt storage means may be readily transported on one of the end sections of such conveyor when it is dismantled.

The invention herein, while not so limited, is especially adapted for use with extensible belt conveyors of the type wherein the conveying reach is supported upon spaced flexible strands. The strands in turn are supported upon standards disposed at intervals throughout the length of the conveying reach, the standards also supporting the return reach of the belt. In a preferred form of the invention, the belt is trained at end head and tail sections, both such sections being mounted for tramming movement, the head section having a belt drive thereat, and the tail section having means for paying out the spaced support strands and maintaining proper tension thereon, such tail section following the advance of mining equipment or the like and receiving the material to be conveyed.

According to the present invention, storage for additional belting which is payed out when the tail section is advanced is achieved by a movable carriage or idler assembly having idlers around which a portion of the return reach is reeved. The idler assembly is moved upon main supporting means therefor which consists of spaced rails which extend inby of one of the end sections and in turn supported upon the standards supporting the conveying reach. Such main supporting means are continuous with supplemental supporting means extending from the aforesaid end section, and the supplemental supporting means likewise consists of spaced rails which together with the rails of the main support means form a track for guiding the carriage or idler assembly in paying out or taking in the belt in accordance with the movement of one of the sections. Means for imposing the proper amount of tension on the conveying reach may preferably also be supported on the spaced rails of the main supporting means, the thrust occasioned by such tensioning means being transmitted by the rails of the main and supplemental supporting means into such end section.

Upon dismantling of the conveyor, the movable carriage or idler assembly can be supported on such end section at the supplemental supporting means thereat, and the rail extensions of the main supporting means and the aforesaid belt tensioning means can also after dismantling be supported on such end section.

With the foregoing considerations in mind, it is a principal object of this invention to provide an improved extensible belt conveyor having an improved structure for paying out and taking up belt in accordance with the length of the conveyor.

Other objects and important features of the invention will be apparent from a study of the specification following taken with the drawings which together describe and illustrate a preferred embodiment of the invention and what is now considered to be the best mode of practicing the principles thereof. Other embodiments may be suggested to those having the benefit of the teachings herein, and it is therefore intended that the scope of the invention not be limited by the precise embodiment shown, such other embodiments being intended to be reserved, especially as they fall within the scope of the subjoined claims.

In the drawings:

Fig. 1 is a plan view of the tail or material receiving section of an extensible conveyor having the improvements according to the present invention embodied therein;

Fig. 2 is a side elevation view thereof;

Fig. 3 is a side elevation view of a head or material discharging section of such an extensible conveyor;

Figure 4:
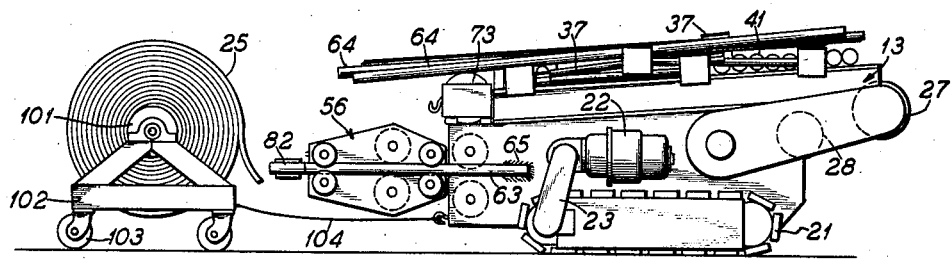
Fig. 4 is a side elevation view of the head or material discharging section of such extensible conveyor, showing the conveyor in a dismantled condition with the head section towing a stored conveyor belt, and also showing the supplemental supporting means for the idler assembly.

Referring now to Figs. 1 to 3 of the drawings, there is shown an extensible conveyor having the improvements according to the present invention embodied therein, and referred to generally by the reference numeral 10. Such a conveyor includes a tail or material receiving section 11 which is connected by intermediate sections 12 to an outby section 13.

The tail section 11 includes side frame members 14 which are mounted for movement upon crawler treads 16, each crawler tread 16 being driven from a motor 17 connected by a sprocket chain 18 thereto.

The head or outby section 13 likewise has spaced frame members 19 which are mounted for movement upon crawler treads 21, and power for driving each crawler tread consists of a drive motor 22 mounted upon each frame member 19, there being a sprocket chain 23 connecting the drive motor 22 with the crawler tread 21.

An endless belt 25 having a conveying reach 24 and a return reach 26 is reeved around a drive pulley 27 at the head section 13, and is additionally trained around a snubber pulley 28 thereat. The other end of the conveying reach 24 is reeved around an idler pulley 29 at the inby of tail section 11, and is additionally guided for movement upon idler pulleys 31 and 32 at the tail section 11.

Figure 5:
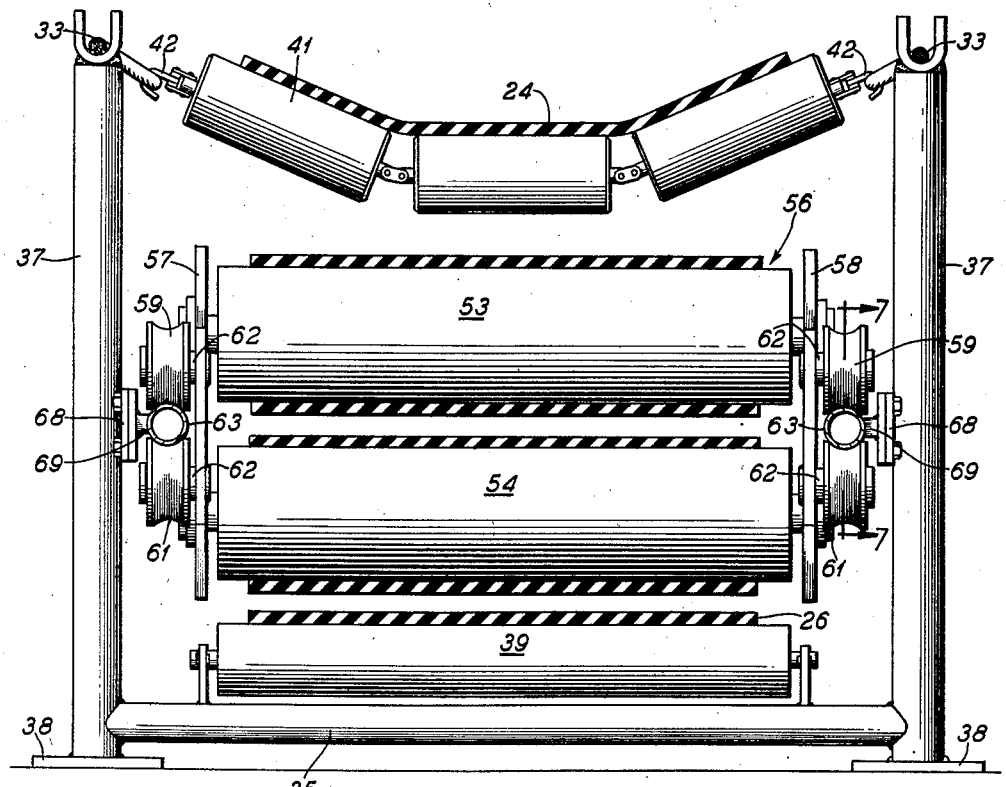
Fig. 5 is a section to an enlarged scale taken along the line 5—5 of Fig. 3, looking in the direction of the arrows, showing details of a movable carriage or idler assembly mounted upon a pair of spaced rails or guides forming the main support means therefor, said idler assembly being movable with respect to the head or discharge section.

The conveying reach 24 is supported upon laterally spaced flexible strands 33, 33, these support strands being supported in brackets 36 each on top of laterally spaced standards 37 having feet 38 in contact with a mine floor or the like. The standards 37 are spaced at regular intervals between the tail section 11 and the head section 13, and each includes a laterally extending spacing strut 35 also forming a support for an idler roller 39 for guiding the return reach 26, see also Fig. 5.

The conveying reach 24 is supported upon troughing roller assemblies 41 which span the distance between the spaced strands 33, and which are anchored to the strands 33 by mounting brackets 42 at each end thereof.

As seen in Fig. 3, the strands 33 are anchored at 43 to the head section 13, and are trained around idler sheaves 44 and 46 at the tail or inby section 11, see Fig. 1, each support strand being wound upon a winch 47 mounted on each side frame 14 of the tail section 11. The winch 47 is arranged to wind the cable 33 thereon, and the amount of tension in each cable is controlled by a fluid motor 48 connected by a sprocket chain 49 to drive the winch 47 in a take up direction, as is more specifically described in an application of Craggs and McCann, Ser. No. 549,603, filed November 29, 1955, for Improvements in Extensible Conveyors.

The belt conveyor shown in Figs. 1 to 3 is of the extensible type and is arranged with storage loops or bights which can be shortened in accordance with the movement of the inby section 11 in following the advance of the working face of a mine or the like. In the preferred form of the invention, the outby section has fixed idler pulleys 51 and 52 which are mounted between the spaced frame members 19, 19. These idler pulleys provide a fixed carriage or idler assembly cooperating with idler pulleys 53 and 54 mounted upon a movable carriage or idler assembly 56, see also Fig. 5. Carriage 56 consists of laterally spaced side frame members 57 and 58 which support the idler rollers 53 and 54. The carriage 56 has on each side thereof longitudinally spaced upper guide rollers 59, 59 and longitudinally spaced lower guide rollers 61, 61, each of such rollers being mounted upon stub axles 62 extending outwardly from the spaced side frame members 57 and 58.

The movable carriage or idler assembly is arranged to move upon supplemental support means consisting of a pair of laterally spaced rails 63, 63 extending one each from the spaced side frames 19 of the head section 13. Each rail 63 is secured to the side frame 19 by a weld 65 seen in Fig. 3. The rails 63, 63 extend inby of the head section 13, see also Fig. 4, for a distance sufficient to support the carriage 56 for a purpose as will appear as this specification proceeds.

Figure 7:
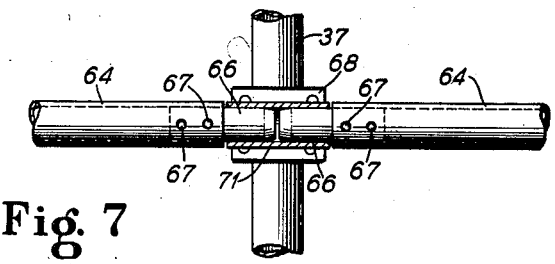
Fig. 7 is an elevation view of part of the main support means for the idler assembly seen in Fig. 5, said view being taken looking in the direction of the arrows 7—7 of Fig. 5.

The rails 63, 63 extending inby of the head section 13 are arranged to connect with main supporting means consisting of similar rails 64, 64 to form a smooth path of travel for the movable carriage or idler assembly, see also Fig. 7, the inby end of each rail 63 being arranged to receive a sleeve 66 fitting within the rail 64. The sleeve 66 is held in a fashion so as to extend from each end of the cooperating rails 64 as by spot welds 67. The ends of each rail 64 are arranged to be supported at a standard 37, each such support standard having welded thereto a bracket 68 with an extension 69 therefrom terminating in a generally cylindrical socket 71 to receive the sleeve like extension 66.

The rails 64 may thus be extended inby of the head section 13 a distance as desired to provide for movement of the carriage or idler assembly 56 upon such rails, the amount of movement of the carriage 56 being determinative of the amount of the extension of the conveyor 10.

Means are provided for imposing tension upon the return reach 26, and to this end the carriage 56 is connected by a cable 72 wound upon a motor driven winch 73. Said winch and motor are supported upon a cross bracket 76 welded at each end to a cylindrical socket 71. The cross bracket 76 has a pair of spaced rails or guides 77, the winch 73 having a single rail 78 arranged to ride between the spaced rails 77, 77 which also act as hold-down members.

Figure 6:
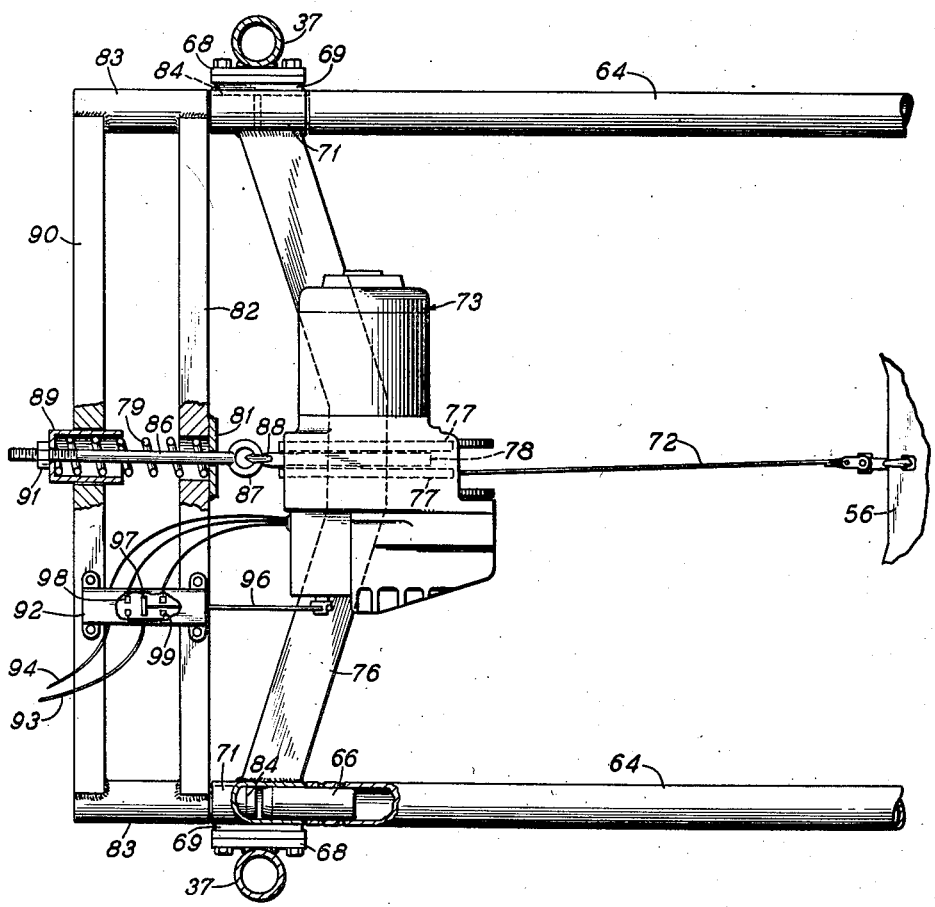
Fig. 6 is a plan view of the main support means for the idler assembly, and showing also a take up winch for the idler assembly, said view being taken looking in the direction of the arrows 6—6 of Fig. 3.

The winch 73 is held in position for limited movement by means of a limit spring 79 having one end abutting a plate 81 welded to a detachable cross frame 82 extending between laterally spaced tubular members 83 each having a sleeve like extension 84 arranged to enter the socket 71 seen in Fig. 6. The spring 79 is loaded by the pull exerted by the winch 73 and its cable 72 by means of an eye rod 86 encircled by the spring 79 and having an eye 87 engaged by a hook 88 on the end of the rail 78. The other end of the spring 79 is bottomed in a cup shaped member 89 guided in a cross frame 90 parallel to cross frame 82. The load on the spring 79 is adjusted by a nut 91.

The winch 73 is arranged to pay out cable 72 when the tension therein increases beyond a predetermined amount as would be occasioned by the tail section 11 following the advance of a continuous miner or the like, or to take in the cable 72 when the entire extensible conveyor 10 is shortened for any reason. The winch motor 73 is accordingly under the control of a directional switch 92 connected to power leads 93 and 94. The movable winch 73 carries with it a circuit closing arm 96 having a movable contact 97, which when closed upon contacts 98 causes the winch to take in cable 72 until the limit spring 79 is stressed once more to a proper value. The movable contact 97 also closes contacts 99 when the cable 72 is stressed in excess of a predetermined amount, the winch 73 under such condition paying out cable until the limit spring 79 is once more stressed to the proper value.

Referring now particularly to Fig. 4 of the drawings, it may be noted that upon dismantling of the conveyor 10, the carriage or idler assembly 56 can be moved to a position of support upon the supplemental supporting means consisting of the spaced rails 63. The other spaced rails 64, 64 forming the main supporting means can be dismantled and stowed atop the head section 13 in the manner shown. The structure appurtenant thereto, viz., the support standards 37 and the troughing roller assemblies 31 may also be stowed atop the head section 13 in the manner shown. The winch 73 may also be stowed on the head section 13, and the conveyor belt 25 can be wound upon a reel 101 situated upon a dolly 102 mounted upon caster wheels 103 as seen in Fig. 4. The dolly 102 can be towed by means of a chain 104 behind the outby section 13.

From the description foregoing it is believed evident that a new and useful improvement in extensible conveyors has been provided. The movable carriage or idler assembly, around which the additional lengths of conveyor belt are reeved, is always in position for movement along both the main and auxiliary support means as has been described. Moreover, such movable carriage can be moved upon dismantling of the conveyor to a position on the head or outby section 13. All of the rail extensions 64 can be readily assembled with the support standards for the conveying reach. It may be noted that the carriage 56 moves at all times between the conveying and return reaches, thereby requiring no extra space for belt take up.

While the invention has been described in terms of the preferred embodiment thereof, its scope is intended to be limited only by the claims here appended.

What is claimed is:

1. An extensible belt conveyor comprising in combination, a head section and a tail section, a belt having a conveying reach and a return reach extending between said sections, a pair of spaced flexible strands extending between said sections for supporting said conveying reach, standard means spaced at intervals throughout the length of said support strands for supporting same, means for paying out additional lengths of said belt in accordance with the increase in length of said conveyor including a movable idler assembly having the return reach of said belt reeved thereon, main support means for said idler assembly being selectively connectable to and disconnectable from one of said sections and itself being supported on said standard means, and supplemental supporting means for said idler assembly carried by and forming a part of said one section and disposed in contiguous proximity with said main supporting means when the latter is connected to said one section whereby said idler assembly can be moved back and forth between the two supporting means.

2. In an extensible belt conveyor having a head section and a tail section, a belt extending between said sections, said tail section being movable relative to the head section for varying the effective length of the conveyor, take-up and storage means for said belt including at least one idler assembly having a bight of said belt reeved thereabout, track means on said head section for supporting said idler assembly at times, separate ground-supported track means selectively connectable to and disconnectable from said head section for supporting said idler assembly at other times, both of said track means being in contiguous alignment when said ground-supported track means is connected to said head section whereby the idler assembly may be moved back and forth between them, and whereby further said head section may be made relatively short and compact for movement from one working place to another by running the idler assembly onto the first-mentioned track means and disconnecting the ground-supported track means therefrom.

3. In an extensible belt conveyor having a head section and a tail section, a belt extending between said sections, said tail section being movable relative to the head section for varying the effective length of the conveyor, take-up and storage means for said belt including at least one idler assembly having a bight of said belt reeved thereabout, first support means comprising a part of one of said sections for supporting said idler assembly at times, second support means being itself ground-supported adjacent said one section and selectively connectable to and disconnectable from said one section for supporting said idler assembly at other times, both of said support means being in contiguous alignment when said second support means is connected to said one section, whereby the idler assembly may be moved back and forth between the first and second support means and whereby further said one section may be made relatively compact for relocation from one working place to another by moving the idler assembly onto said first support means and disconnecting said second support means from said one section, and means at one end of one of said support means urging said idler assembly in a direction to apply tension to the belt.

4. In an extensible belt conveyor having separate, movable head and tail sections, a belt extending therebetween, said tail section having self-powered tramming means for varying the effective length of the conveyor, said head section having self-powered tramming means for relocation between working places, take-up and storage means for said belt including at least one idler assembly having a portion of said belt reeved thereabout, means for maintaining a predetermined tension on said belt, main supporting means itself ground-supported adjacent one of said sections and including first track means selectively connectable to and disconnectable from said one section along which said idler assembly is movable, supplemental supporting means carried by said one section and including second track means in contiguous alignment with said first track means when said first track means is connected to said one section, whereby said one section can be shortened for tramming to a new location by moving the idler assembly onto the supplemental supporting means and disconnecting the main supporting means.

5. In an extensible belt conveyor having separate, mobile head and tail sections, a belt extending therebetween, take-up and storage means at the head section including at least one idler assembly having a bight of said belt reeved thereabout, main supporting means along which said idler assembly is movable, said main supporting means being ground-supported and connectable to and disconnectable from said head section, supplemental supporting means along which said idler assembly is movable, said supplemental supporting means being carried by and forming a part of said head section, means for connecting said main and supplemental supporting means in contiguous alignment when said main supporting means is connected to said head section whereby said idler assembly may work back and forth between them in normal operation of the conveyor, said means being operable to disconnect said main supporting means from said head section after moving the idler assembly onto the supplemental supporting means whereby the head section is rendered relatively compact for relocation.

6. In a belt conveyor having a conveying reach and a return reach, a movable end section around which said belt is trained, means for paying out additional lengths of said belt in accordance with the length of said conveyor belt including a movable idler assembly having a portion of said belt reeved thereon, and means on said end section for supporting said idler assembly, said means comprising a first pair of laterally spaced rails carried by said end section, a second pair of laterally spaced rails selectively connectable to and disconnectable from said end section and disposed continuous with said first pair of rails when connected to said end section, and means for supporting said second pair of rails independently of said end section at intervals throughout the length thereof, said idler assembly being movable between said first and second pairs of rails.

7. An extensible belt conveyor comprising in combination, a head section and a tail section, a belt having a conveying reach and a return reach extending between said sections, a pair of spaced flexible strands extending between said sections for supporting said conveying reach, standards spaced at intervals throughout the length of said support strands for supporting same, means for paying out additional lengths of said belt in accordance with the increase in length of said conveyor including a movable idler assembly having the return reach of said belt reeved thereon, and means extending from one of said sections for supporting said idler assembly, said means comprising a first pair of laterally spaced rails selectively connectable to and disconnectable from said one section and supported on said standards and a second pair of laterally spaced rails carried by said one section and disposed in contiguous alignment therewith when the first pair of rails are connected to said one section to permit said idler assembly to move back and forth thereon.

8. An extensible belt conveyor comprising in combination, a head section and a tail section, a belt having a conveying reach and a return reach extending between said sections, a pair of spaced flexible strands extending between said sections for supporting said conveying reach, standards spaced at intervals throughout the length of said support strands for supporting same, means for paying out additional lengths of said belt in accordance with the increase in length of said conveyor including a movable idler assembly having the return reach of said belt reeved thereon, and support means for said movable idler assembly, said support means comprising a supplemental support carried by and extending from one of said sections and a main support selectively connectable to and disconnectable from said one section and ground-supported by said standards independently of said one section, said supplemental support and main support being disposed in contiguous alignment when said main support is connected to said one section to permit said idler assembly to be moved back and forth thereon.

9. An extensible belt conveyor comprising in combination: a head section, a tail section including means for moving said tail section, a belt having a conveying reach and a return reach extending between said sections, a pair of spaced flexible strands extending between said sections for supporting said conveying reach, means at said tail section for paying out additional lengths of said strands as said conveyor is lengthend, a plurality of standards spaced at intervals throughout the length of said support strands, means extending laterally of said support strands for supporting said conveying reach, means for paying out additional lengths of said belt in accordance with the increase in length of said conveyor including a first idler assembly disposed at said head section, a movable idler assembly spaced from said first idler assembly, both of said assemblies having the return reach of said belt reeved thereon, main support means for said movable idler assembly selectively connectable to and disconnectable from said head section, said main support means being supported upon said standards, and supplemental supporting means extending from said head section and disposed in contiguous proximity to the said main supporting means whereby the movable idler assembly can be moved back and forth between the two supporting means.

10. The combination in an extensible conveyor of a pair of end sections including means for tramming said sections, a belt having a conveying reach and a return reach extending between said sections, flexible strand means extending between said sections for supporting the conveying reach only of said belt, standards spaced at intervals throughout the length of said flexible strand means for supporting same, means for paying out additional lengths of said belt in accordance with the increase in length of said conveyor comprising a pair of idler carriages one of which is movable with respect to the other, said carriages having the return reach of said belt reeved therebetween to form a belt storage loop, support means for said one movable idler carriage including rail means supported by and extending from one of said end sections toward the other end section, and other rail means being supported by said standards and selectively connectable to and disconnectable from said one end section, said other rail means being disposed continuous with said first named rail means when connected to said one end section to afford a path for movement of said one movable idler carriage in its movement relative to the other idler carriage.

11. The combination in an extensible conveyor of a pair of end sections including means for tramming said sections, a belt having a conveying reach and a return reach extending between said sections, flexible strand means extending between said sections for supporting the conveying reach only of said belt, standards spaced at intervals throughout the length of said flexible strand means for supporting same, means for paying out additional lengths of said belt in accordance with the increase in length of said conveyor comprising a pair of idler carriages at least one of which is movable with respect to the other, said carriages having the return reach of said belt reeved therebetween to form a belt storage loop, support means for the movable idler carriage including rail means supported by and extending from one of said end sections toward the other end section, and other rail means supported by said standards and selectively connectable to and disconnectable from said one section, said other rail means being disposed continuous with said first named rail means when connected to said one end section to afford a path for movement of the movable idler carriage in its movement relative to the other idler carriage, said first named rail means affording a place of storage for the movable idler carriage when said other rail means is disconnected from said one end sections.

12. The combination in an extensible conveyor of a pair of end sections including means for tramming said sections, a belt having a conveying reach and a return reach extending between said sections, flexible strand means extending between said sections for supporting the conveying reach only of said belt, standards spaced at intervals throughout the length of said flexible strand means for supporting same, means for paying out additional lengths of said belt in accordance with the increase in length of said conveyor comprising a pair of idler carriages, one being movable with respect to the other, and having the return reach of said belt reeved therebetween to form a belt storage loop, support means for said movable idler carriage including rail means supported by and extending from one of said end sections toward the other end section, and other rail means being supported by said standards and selectively connectable to and disconnectable from said one end section, said other rail means being continuous with said first named rail means when connected to said one end section to afford a path for movement of said movable idler carriage in its movement relative to the other idler carriage, and means cooperating with said idler carriages to impose tension on said belt storage loop.

13. The combination in an extensible conveyor of a head section and a tail section, means for tramming said tail section, a belt having a conveying reach and a return reach extending between said sections, flexible strand means extending between said sections for supporting the conveying reach only of said belt, means at said tail section for paying out additional lengths of said flexible strand means as said conveyor is lengthened, standards spaced at intervals throughout the length of said flexible strand means for support of said flexible strand means, means for paying out additional lengths of said belt in accordance with the increase in length of said conveyor comprising a pair of idler carriages, at least one being movable with respect to the other, said idler carriages having the return reach of said belt reeved therebetween to form a belt storage loop, and support means for said movable idler carriage including rail means supported by and extending from said head section toward the tail section, and other rail means supported by said standards and selectively connectable to and disconnectable from said head section, said other rail means being continuous with said first named rail means when connected to the head section to afford a path for movement for the movable idler carriage in the movement relative to the other.

References Cited in the file of this patent

UNITED STATES PATENTS

| 1,748,301 | McKinlay | Feb. 25, 1930 |
| 2,640,582 | Madeira | June 2, 1953 |

FOREIGN PATENTS

| 157,144 | Australia | June 18, 1954 |